Feb. 11, 1958 C. H. WEST 2,822,588
JOINING STRIP FOR PLASTIC SHEETS
Filed Feb. 4, 1957

INVENTOR.
CLIFFORD WEST
BY
W. B. Harpman
ATTORNEY

United States Patent Office 2,822,588
Patented Feb. 11, 1958

2,822,588

JOINING STRIP FOR PLASTIC SHEETS

Clifford H. West, Youngstown, Ohio, assignor to C & J Service, Inc., Youngstown, Ohio, a corporation of Ohio Application February 4, 1957, Serial No. 638,147

4 Claims. (Cl. 20—92)

This invention relates to a joining strip usable for securing plastic sheets in edgewise relation to one another.

The principal object of the invention is the provision of a joining strip incorporating means for securing and sealing the edges of sheets thereto.

A further object of the invention is the provision of a joining strip which may be inexpensively formed as an extrusion of suitable material.

A still further object of the invention is the provision of a joining strip which will receive flat or arcuate edge sections of sheets to be joined and secure the same in sealed relation.

A still further object of the invention is the provision of a joining strip for corrugated "Fiberglass" sheets.

The joining strip disclosed herein is particularly suitable for securing and sealing the adjacent longitudinal edges of corrugated "Fiberglass" sheets such as used in awnings, patio roofs, skylights, windows and the like and which have heretofore been secured to one another in overlapping relation and fastened with metal screws and/or rivets and the like.

The joining strip disclosed herein may be formed of translucent "Fiberglass" material of a color and light transmitting quality comparable with the "Fiberglass" sheets to be joined or it may alternately be formed of other suitable material including the various artificial resins known in the art and aluminum and other metals known in the art.

The joining strip incorporates oppositely disposed deep narrow channels in which the longitudinal edges of the sheets to be joined are positioned. The joining strip incorporates resilient members positioned partially in undercut grooves communicating with the narrow deep channels, the resilient members including flanges which are distorted when engaged by the edges of sheets positioned in the joining strip in a manner so that they are held in such position and sealed with respect thereto.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
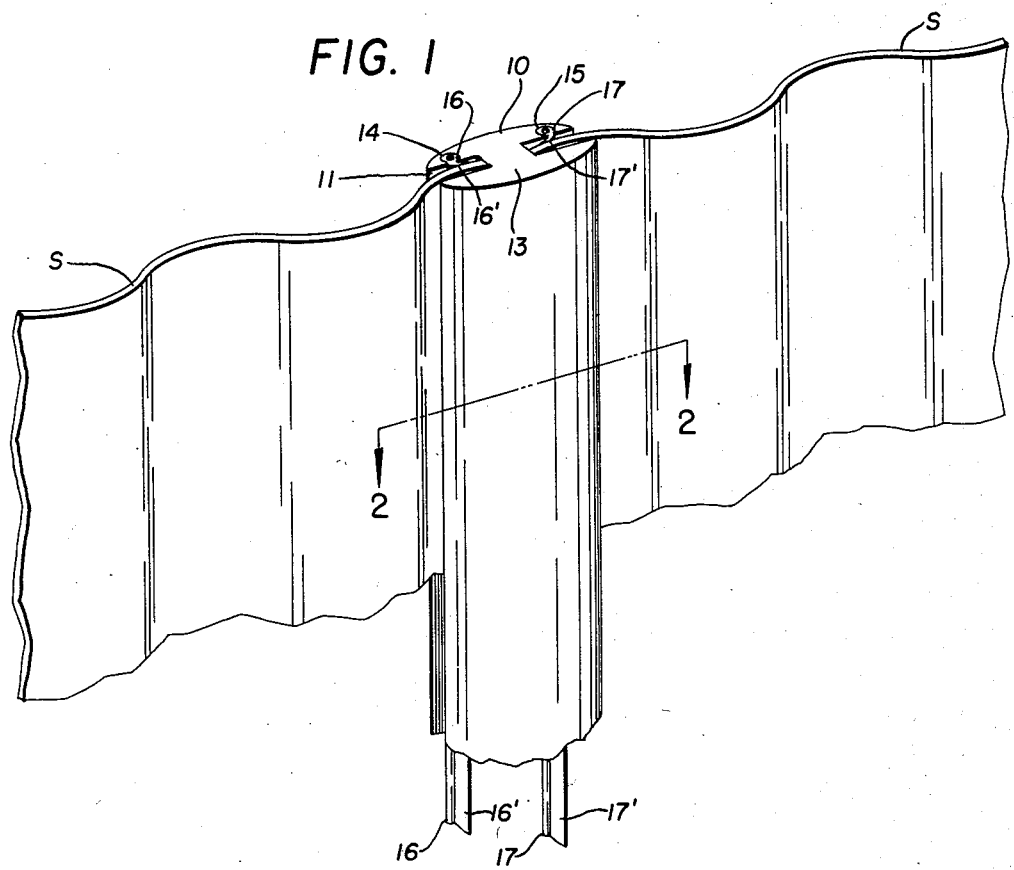
Figure 1 is a perspective view of a section of the joining strip showing two small sections of corrugated "Fiberglass" sheet positioned therein.

By referring to the drawing and Figure 1 in particular it will be seen that the joining strip comprises an elongated shape 10, relatively wider than its thickness, having oppositely disposed, deep, narrow channels 11 and 12 formed inwardly along its longitudinal edges. The deep narrow channels 11 and 12 terminate in spaced relation to one another within the shape 10 and with the same define an interconnecting web portion 13.

Secondary channels 14 and 15 are formed in the shape 10 longitudinally thereof and in respective communication with the deep narrow channels 11 and 12. The secondary channels 14 and 15 are narrower at their point of communication with the channels 11 and 12 than inwardly thereof so that longitudinally extending resilient members 16 and 17, respectively, may be distorted and moved partially thereinto where they will be self-retaining.

The longitudinally extending resilient members 16 and 17 are shown extending below the lower end of the shape 10 in Figure 1 of the drawing, and it will be observed that they comprise a circular section having a sidewardly extending flange 16' and 17', respectively, which flanges 16' and 17' extend longitudinally and are distorted when edge portions of "Fiberglass" sheets S—S are positioned in the deep narrow channels 11 and 12. The action is illustrated in the cross section comprising Figure 2 of the drawing wherein the flanges 16' and 17' will be seen to be bent inwardly and distorted as to size and shape and to thereby effect a sealing and clamping action on the respective edges of the "Fiberglass" sheets S—S.

Figure 2:
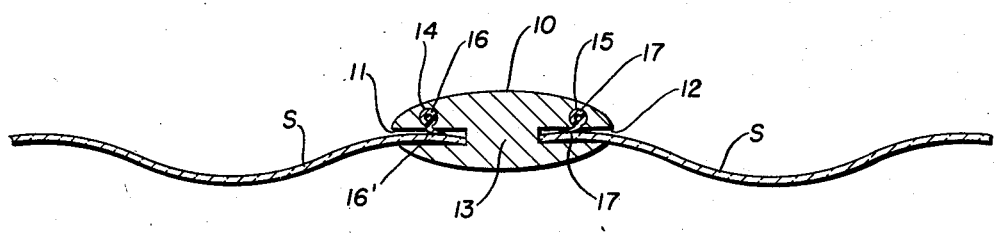
Figure 2 is a horizontal section taken on line 2—2 of Figure 1.

It will occur to those skilled in the art that while the "Fiberglass" sheets S—S shown herein are corrugated and the edge sections are arcuate when viewed in cross section, as in Figure 2 of the drawing, the narrow deep channels 11 and 12 will receive straight edge sections of other sheet materials equally advantageously.

In each instance, the resilient flanges 16' and 17' will be distorted by the movement of the edge sections of the sheets into the deep narrow channels 11 and 12 so that a sealing and clamping action thereon results.

It has been determined that the clamping and sealing action produced by the disclosed construction is sufficient to form a satisfactory awning, patio or window construction without additional fastenings being used between the joining strip and/or the panel materials used.

It will thus be seen that the novel structure and formation of the joining strip herein disclosed results in a practical and efficient construction device particularly useful in joining the edges of light transmitting plastic sheeting materials in that it may be and preferably is formed of similar materials of the same or similar light transmitting qualities.

It will occur to those skilled in the art that the use of the joining strip herein disclosed produces a satisfactory and relatively inexpensive construction where a multiplicity of panels or sheets are to be employed in that there is no necessity of overlapping the edges of the panels or sheets, as heretofore believed necessary, which results in a saving in the actual sheet or panel used which normally offsets the cost of the joining strip itself. In addition to this savings, the ease of installation and attractiveness of the joint formed with the device render the completed awning, patio roof, window, partition or the like structurally sound, and capable of being removed and reused if necessary.

Having thus described my invention, what I claim is:

1. A joining strip for plastic sheets comprising an elongated body member of a flattened oval shape in cross section having oppositely disposed, inwardly formed, deep, narrow channels in its opposite side edges, secondary channels in said elongated body member, one of each of which communicates with one of said first-mentioned channels inwardly from the entrance thereof, the entrance of said secondary channels being narrower than said secondary channels inwardly thereof, and elongated resilient members having longitudinally extending flange formations disposed one in each of said secondary channels with said flange formations extending into said first-mentioned channels.

2. A joining strip for plastic sheets as set forth in claim 1 and wherein the elongated resilient members are tubular.

3. A joining strip for plastic sheets as set forth in claim 1 and wherein the elongated body member is formed of extruded translucent plastic material.

4. A joining strip for plastic sheets as set forth in claim 1 and wherein the oppositely disposed channels are formed on a common center line.

References Cited in the file of this patent
UNITED STATES PATENTS

| | | |
|---|---|---|
| 2,189,138 | Eichner | Feb. 6, 1940 |
| 2,470,403 | Klomparens | May 17, 1949 |